United States Patent Office 3,586,477
Patented June 22, 1971

3,586,477
REMOVAL OF FERRIC IRON FROM AQUEOUS
SOLUTIONS OF ALUMINUM SALTS
Harold William Flood, Acton, Mass., assignor to Arthur
D. Little, Inc., Cambridge, Mass.
No Drawing. Filed Oct. 16, 1968, Ser. No. 768,180
Int. Cl. C01f 7/66, 7/74
U.S. Cl. 23—102                                    6 Claims

ABSTRACT OF THE DISCLOSURE

An ion-exchange liquid and method of using it for extraction of relatively small amounts of ferric iron from aqueous solutions of aluminum salts of nitric, sulfuric or hydrochloric acid. The ion-exchange liquid comprises a water-immiscible organic liquid carrier and a mixture of di(2-ethyl-hexyl) hydrogen phosphate and tributyl phosphate or a primary amine. When it is brought into direct contact with the aqueous solution, the ferric iron ions are transferred to the ion-exchange liquid from the aqueous solution to be purified.

This invention relates to a process for separating iron from aluminum and more particularly for separating traces of ferric iron from concentrated aqueous solutions of aluminum salts of strong mineral acids and more particularly from aqueous solutions of aluminum nitrate, aluminum sulfate and aluminum chloride.

In metallurgical processes in which it is desirable to recover aluminum from ferruginous aluminum bearing ores, it is necessary to remove the iron values in a substantially quantitative manner to be able to produce $Al_2O_3$ of sufficient purity to be reduced to aluminum, for example by the Hall process. Aluminum can be readily leached from calcined clays using nitric, sulfuric or hydrochloric acid. After the clay insolubles are removed, a small but intolerable amount of ferric ion, along with other trace impurities, may remain dissolved in the aqueous solution of aluminum salt. These ferric ions must be removed before the aluminum salt is converted to aluminum oxide for reduction to aluminum metal. This is conveniently accomplished through the use of a liquid extractant which is preferably one which can be stripped of its contained iron and reused.

In U.S. Pat. 3,211,521 there is disclosed and claimed a process for removing ferric iron from such solutions by the use of an ion-exchange liquid comprising a carrier (if required) and an extractant having the formula $HRR'PO_4$ wherein R is alkyl having at least 8 carbon atoms and R' is hydrogen or alkyl. One of the preferred extractants disclosed was di(2-ethylhexyl) hydrogen phosphate (sometimes referred to as dioctyl phosphoric acid). Although this organic extractant can be used to extract ferric ions from aluminum salt solutions, a relatively large number of contacting steps are required to achieve the desired degree of iron removal, and it is not capable of removing other metal ions to any appreciable extent. Moreover, the continued use of the di(2-ethylhexyl) hydrogen phosphate can cause a build-up of phosphorus in the purified aluminum solution. It, therefore, becomes desirable to have available an extractant in an organic liquid which is more efficient in extracting ferric ions from such solutions as well as other metal ions such as calcium and magnesium while minimizing the amount of aluminum extracted and maintaining the aqueous aluminum salt solution free from the introduction of undesirable ions, particularly phosphates.

I have found that ferric ion, along with calcium and magnesium ions, can be removed from an aqueous solution of an aluminum salt of a strong mineral acid by contacting the aqueous phase with an organic phase liquid containing a combination of di(2-ethylhexyl) hydrogen phosphate and tributyl phosphate, the combination being one which exhibits a marked synergistic effect. Certain primary amines in a free base form may be substituted for the tributyl phosphate.

It is, therefore, a primary object of this invention to provide an effective liquid ion-exchange extractant for iron as well as other metals. It is another object to provide such an extractant which introduces essentially no contaminants into the solution to be purified in the removal of iron ions. It is yet another object to provide a process for removing iron from aluminum nitrate, aluminum sulfate, or aluminum chloride leach liquors which, at the same time, removes only negligible quantities of aluminum. These and other objects will become apparent in the following description of this invention.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

The use of a liquid cation-exchange reagent for separating heavy metals from process streams presents several attractive features. The first of these is the fact that most metals exist in solution as cations and can thus be extracted without preliminary addition of a complexing agent to the aqueous phase. Second, if the cation-exchange extractant is in the hydrogen form, then the output stream of the solvent extraction step will contain only hydrogen ions in addition to any deliberately non-extracted metals. Third, if the replaceable hydrogen of the extractant is weakly acidic, then the degree of loading and the selectivity for different metals can be controlled by adjusting the pH of the aqueous input stream. Furthermore, the use of liquid ion-exchange extraction systems, rather than ion-exchange resins, generally allows higher concentrations of metal values in process streams, thus reducing capital costs per pound of metal produced.

The chemistry involved in liquid ion-exchange is somewhat similar to that of ion-exchange using solid resins. The primary difference lies in the use of a liquid exchange agent (generally dissolved in an organic solvent) instead of a solid resin. However, the process using an ion-exchange liquid may be more accurately described as a combination of ion exchange and solvent extraction because the organometallic compound or complex resulting from the liquid ion-exchange reaction must remain soluble in the organic phase which contains the water-insoluble ion-exchange reagent.

The ion exchange liquid of this invention comprises di(2-ethylhexyl)hydrogen phosphate with a synergist dissolved in a water-immiscible organic solvent carrier. The method of this invention may be defined as being characterized by the step of contacting an acidic aluminum solution with an ion-exchange liquid which is a solution of di(2-ethylhexyl) hydrogen phosphate $H(C_8H_{14})_2PO_4$ and tributyl phosphate $(C_4H_9)_3PO_4$ (or a high molecular weight, oil-soluble, water-insoluble, primary amine in free-base form) in a water-immiscible organic solvent for the extractants. The organic solvent carrier for the extractant mixture must be one which does not dissolve appreciably in water, nor react with the aluminum nitrate, aluminum sulfate or aluminum chloride leach liquor to be treated for iron removal, nor emulsify with the aqueous phase.

Among the organic liquids which have been found to be suitable as a carrier solvent for the extractant mixture may be listed the aliphatic hydrocarbons, including kerosene and heptane, and aromatics such as xylene. Kerosene has been found to be a particularly suitable solvent for formulating an ion-exchange liquid to be used for aluminum nitrate solutions.

In formulating the ion-exchange liquid, the di(2-ethylhexyl) hydrogen phosphate and tributyl phosphate are dissolved in the kerosene. The concentration of the di(2-ethylhexyl) hydrogen phosphate may range from 0.5 to 2 molar, with about one molar being preferred. The ratio of di(2-ethylhexyl) hydrogen phosphate to tributyl phosphate (or other synergist) many range from 5-to-1 to 100-to-1 with about 10-to-1 being preferred.

In commercially available di(2-ethylhexyl) hydrogen phosphate here is generally present a small but detectable amount of 2-ethylhexyl dihydrogen phosphate which is water-soluble. This impurity is undesirable for it will dissolve in the aqueous aluminum salt solution and show up as unwanted phosphate in the product aluminum. The 2-ethylhexyl dihydrogen phosphate may be removed by washing the di(2-ethylhexyl) hydrogen phosphate with water or dilute aqueous nitric acid. This problem does not generally cause serious difficulty in a continuous system where the organic extractant is continuously recycled since makeup of fresh reagent is low and the recycled extractant is free of the water-soluble portion.

The step of contacting the aqueous and organic phases may be accomplished by any manner known in the art for scrubbing a first liquid with a second immiscible liquid. Thus countercurrent scrubbing towers may be used and the contacting step is carried out or repeated until substantially all of the iron has been transferred from the aqueous phase to the organic phase. The number of extraction stages, e.g., number of actual contactings made between the leach liquor and cation-exchange liquid will depend upon the excess free acid present in the aqueous leach liquor, upon the amount of iron present, and upon the efficiency of transfer in the contact made between the two liquid phases. Other suitable extraction equipment which may be used include, but are not limited to, mixer-settlers and centrifugal extractors. Separation of the organic and aqueous phases may be accomplished by decantation or by the use of centrifugal separators, the latter method being generally the more efficient.

The aqueous phase leach liquor generally has a pH of about 1 to 2 and at this acidity the iron is removed, while only negligible quantities of aluminum are extracted. Under these conditions the iron is bonded to the extractants by a reaction which may be postulated as follows for the nitrate system

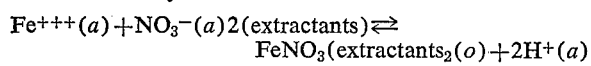

$$Fe^{+++}(a) + NO_3^-(a) 2(\text{extractants}) \rightleftarrows$$
$$FeNO_3(\text{extractants}_2(o) + 2H^+(a)$$

where $(a)$ and $(o)$ indicate the aqueous and organic phases, respectively. Apparently the nitrate oxyanion as well as the iron have a considerable affinity for the anion of the extractant mixture, and the relatively high concentration of nitrate in the aluminum leach liquor tends to favor the forward direction of the reactant. A similar reaction may, of course, be written for the aluminum sulfate system, or for the aluminum chloride system.

The ratio of the volume of the aqueous phase leach liquid to the volume of cation-exchange liquid should range from about 2-to-1 to about 10-to-1. The volume of cation-exchange liquid used per unit volume of leach liquor will, of course, depend strongly upon the amount of iron which is to be removed from the leach liquor, and upon the ability of the extractant to pick up the iron, that is the degree to which the extractant can be loaded with iron. It is desirable, however, to use sufficient ion-exchange liquid so that it is not completely loaded with iron. This permits removal of other metallic ions. If the stoichiometric limit of di(2-ethylhexyl) hydrogen phosphate is reached, it may be that some non-ferric ions which are contained in the organic phase will be displaced by ferric ions, a condition which prohibits taking advantage of the additional extraction capabilities of the ion-exchange liquid of this invention.

Inasmuch as the extractants are subject to thermal and chemical degradation over an extended period of use if they are employed at excessively high temperature and/or with too concentrated aqueous solutions, it is preferable to maintain the aqueous solution at a temperature no higher than about 60° C. during contacting with the ion-exchange liquid and to maintain the concentration of the aluminum salt in the aqueous phase at no greater than about 55% by weight.

The liquid ion-exchange composition and method of this invention may be described in further detail with reference to the following examples which are meant to be illustrative and not limiting.

An aluminum-bearing clay designated "Sample No. 1" was calcined at a temperature between 800 and 850° C. for one hour. The calcined clay was then leached with 55% aqueous nitric acid in a quantity to provide 100% of the stoichiometric quantity of $HNO_3$ based on the aluminum content of the clay. The insolubles were filtered out and the resulting raw leach liquor containing aluminum nitrate in an aqueous phase was divided to provide four 250-ml. portions.

Three different ion-exchange liquids were prepared. The first of these consisted of kerosene having dissolved therein di(2-ethylhexyl) hydrogen phosphate in a one-molar concentration. The second consisted of kerosene having dissolved therein one molar di(2-ethylhexyl) hydrogen phosphate and one-tenth molar tributyl phosphate; and the third was identical to the second except that a high-molecular weight, oil-soluble, water-insoluble, primary amine in free-base form (sold by Rohm & Haas Company under the trade name Amberlite XLA-3) was substituted in the same concentration for the tributyl phosphate. In all cases the di(2-ethylhexyl) hydrogen phosphate was first washed with one normal nitric acid to remove any water-soluble phosphates.

The first 250-ml. portion of the raw leach liquor was not treated; while the second, third and fourth portions were washed once by countercurrent liquid-to-liquid contact with the first, second and third ion-exchange liquids, respectively. The ratio of aqueous to organic phase was 1-to-1 and the temperature of the liquids during the washings was maintained at 25° C.

The untreated and the three treated leach liquor samples were then subjected to quantitative chemical analyses to determine the amounts of $Al_2O_3$, $Fe_2O_3$, $CaO$, $MgO$ and $P_2O_5$. The results of these analyses are summarized in Table 1 under the heading "Sample No. 1."

It will be appreciated that column (1) represents the quantities of the various oxides present in the untreated leach liquor while column (2) represents the ability of the prior art method (use of di(2-ethylhexyl) hydrogen phosphate discussed above) to remove various ions. The data in columns (3) and (4) indicate the results obtained using the ion-exchange liquid and method of this invention.

From the data in Table 1 it will be seen that the ion-exchange liquid of this invention may remove less aluminum than the prior art method. This is, of course, a desirable situation. The ion-exchange liquid of this invention reduced the iron content to considerably below that previously attainable, reduced the calcium (as CaO) to about one-half that present in the untreated or prior art-treated leach liquor and materially reduced the magnesium (as MgO) content. Finally, the use of the di(2-ethylhexyl) hydrogen phosphate and tributyl phosphate maintained, or slightly lowered, the phosphates (as $P_2O_5$) content.

TABLE 1

[Composition of alumina produced from aluminum nitrate leach liquor before and after a single-stage treatment with ion-exchange liquids]

| Oxide | Sample No. 1 | | | | Sample No. 2 | | |
|---|---|---|---|---|---|---|---|
| | Untreated | DEHHP [1] | DEHHP plus TBP [2] | DEHHP plus Amine [3] | Untreated | DEHHP [1] | DEHHP plus TBP [2] |
| $Al_2O_3$ | 98.93 | 99.66 | 99.71 | 99.67 | 97.20 | 98.34 | 98.52 |
| $Fe_2O_3$ | 0.7202 | 0.0049 | 0.0036 | 0.0035 | 1.0835 | 0.0134 | 0.0071 |
| CaO | 0.0872 | 0.0753 | 0.0368 | 0.0402 | 0.1181 | 0.0782 | 0.0315 |
| MgO | 0.0374 | 0.0346 | 0.0261 | 0.0237 | 0.2130 | 0.1584 | 0.0559 |
| $P_2O_5$ | 0.0747 | 0.0778 | 0.0736 | 0.0934 | 0.0068 | 0.0051 | 0.0031 |

[1] DEHHP = Di(2-ethylhexyl) hydrogen phosphate.
[2] TBP = Tributyl phosphate.
[3] Amberlite XLA-3.

A second aluminum-bearing clay, designated "Sample No. 2" was treated in an identical manner to that of Sample No. 1 using the first and second ion-exchange liquids prepared as described. The comparable analyses are also given in Table 1. As in the case of Sample No. 1, the extractant mixture of di(2-ethylhexyl) hydrogen phosphate and tributyl phosphate removed less $Al_2O_3$ and considerably more iron, calcium, magnesium and phosphorus than the ion-exchange liquid which contained only di(2-ethylhexyl) hydrogen phosphate. For example, the ion-exchange liquid of this invention left a little more than one-half as much iron in the purified leach liquor as the prior art ion-exchange liquid. Finally, it reduced the phosphorus content to less than one-half that of the raw leach liquor.

When these results are extrapolated to a commercial-scale operation the marked, unexpected advantages realized by the ion-exchange liquid of this invention become apparent. Because of the effectiveness of the extractants, the quantity of ion-exchange liquid required to treat the aluminum salt solution is materially reduced as are also the number of times the aqueous phase must be contacted. The removal of other metal ions is highly desirable, and the maintenance or lowering of the phosphorus levels is of extreme importance in the physical properties of the final product aluminum.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

I claim:

1. A method of removing minor quantities of iron and other metallic values from an aqueous liquid containing aluminum dissolved in a strong mineral acid, characterized by contacting said aqueous liquid having a pH from about 1 to 2 with an essentially water-immiscible organic liquid having dissolved therein di(2-ethylhexyl) hydrogen phosphate in a concentration of from 0.5 to 2 molar and a synergistic additive selected from the group consisting of tributyl phosphate and a high molecular weight, oil-soluble, water-insoluble primary amine in free base form, the ratio of said di(2-ethylhexyl) hydrogen phosphate to said synergistic additive ranging from 5-to-1 to 100-to-1 and the ratio of the volume of said aqueous liquid to said organic liquid ranging from about 2 to 1 to about 10 to 1.

2. A method in accordance with claim 1 wherein said synergistic additive is tributyl phosphate, said organic liquid is kerosene and the molar ratio of di(2-ethylhexyl) hydrogen phosphate to tributyl phosphate is about ten-to-one.

3. A method in accordance with claim 2 wherein the concentration of said di(2-ethylhexyl) hydrogen phosphate is about one molar.

4. A method in accordance with claim 1 wherein said aqueous liquid comprises from 50–55% by weight aluminum nitrate in aqueous nitric acid.

5. A method in accordance with claim 4 wherein said nitrate solution is heated to a temperature not in excess of 60° C. prior to said contacting.

6. A method in accordance with claim 1 further characterized by the step of washing said di(2-ethylhexyl) hydrogen phosphate prior to dissolving it in said kerosene, thereby to remove water-soluble phosphates.

References Cited

UNITED STATES PATENTS 3,320,032   5/1967   Feller _____ 23—312
3,323,865   6/1967   Michener et al. _____ 23—123
3,343,912   9/1967   Schulz et al. _____ 23—102

OSCAR R. VERTIZ, Primary Examiner

G. O. PETERS, Assistant Examiner

U.S. Cl. X.R.

23—123; 210—38